United States Patent
Her

(10) Patent No.: US 9,274,301 B2
(45) Date of Patent: Mar. 1, 2016

(54) WIRE HOLDER

(71) Applicant: HON HAI PRECISION INDUSTRY CO., LTD., New Taipei (TW)

(72) Inventor: Shyue-Dar Her, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 142 days.

(21) Appl. No.: 14/132,110

(22) Filed: Dec. 18, 2013

(65) Prior Publication Data

US 2014/0169750 A1    Jun. 19, 2014

(30) Foreign Application Priority Data

Dec. 19, 2012    (TW) .............................. 101224544 U

(51) Int. Cl.
*G02B 6/00* (2006.01)
*G02B 6/44* (2006.01)

(52) U.S. Cl.
CPC ............ *G02B 6/4471* (2013.01); *G02B 6/4457* (2013.01)

(58) Field of Classification Search
CPC .............................. G02B 6/4471; G02B 6/4457
USPC ........................................................ 385/137
See application file for complete search history.

(56) References Cited

U.S. PATENT DOCUMENTS

| | | | | |
|---|---|---|---|---|
| 5,724,469 | A * | 3/1998 | Orlando | 385/135 |
| 6,278,830 | B1 * | 8/2001 | Levesque et al. | 385/136 |
| 6,396,989 | B1 * | 5/2002 | Johnston et al. | 385/134 |
| 6,643,444 | B1 * | 11/2003 | Putnam | 385/135 |
| 7,711,233 | B2 * | 5/2010 | MaHoney | 385/135 |
| 7,997,520 | B2 * | 8/2011 | Criscione et al. | 242/400.1 |
| 9,051,153 | B2 * | 6/2015 | Lichoulas et al. | |
| 2009/0220205 | A1 * | 9/2009 | Tsutsumi et al. | 385/137 |
| 2013/0259438 | A1 * | 10/2013 | Chu | 385/135 |

FOREIGN PATENT DOCUMENTS

EP    2620794 A1 *    7/2013
WO    WO 02070386 A1 *    9/2002

* cited by examiner

*Primary Examiner* — Sung Pak
(74) *Attorney, Agent, or Firm* — Novak Druce Connolly Bove + Quigg LLP

(57) ABSTRACT

A wire holder used to safely receive optical fiber cables. The wire holder includes a main body and a plurality of collection arms. The main body defines a rotation axis and includes a first cylindrical outer surface. The plurality of collection arms extends from the first cylindrical outer surface encircling the cylindrical outer surface. Each collection arm includes a first fixing poles extending substantially parallel to the rotation axis. Each first fixing pole defines two openings passing through the first fixing poles. The openings of the first fixing poles form a first circular space to receive the optical fiber cables.

9 Claims, 6 Drawing Sheets

WIRE HOLDER

BACKGROUND

1. Technical Field

The present disclosure generally relates to a wire holder.

2. Description of Related Art

Optical fiber cables are widely used in telecommunication systems to carry optical signals. Unlike electrical wires and cable, optical fiber cables cannot be kinked without risking damage to the optical fiber and loss of optical signal.

What is needed, therefore, is a means which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Reference will be made to the drawings to describe various embodiments.

Figure 1:
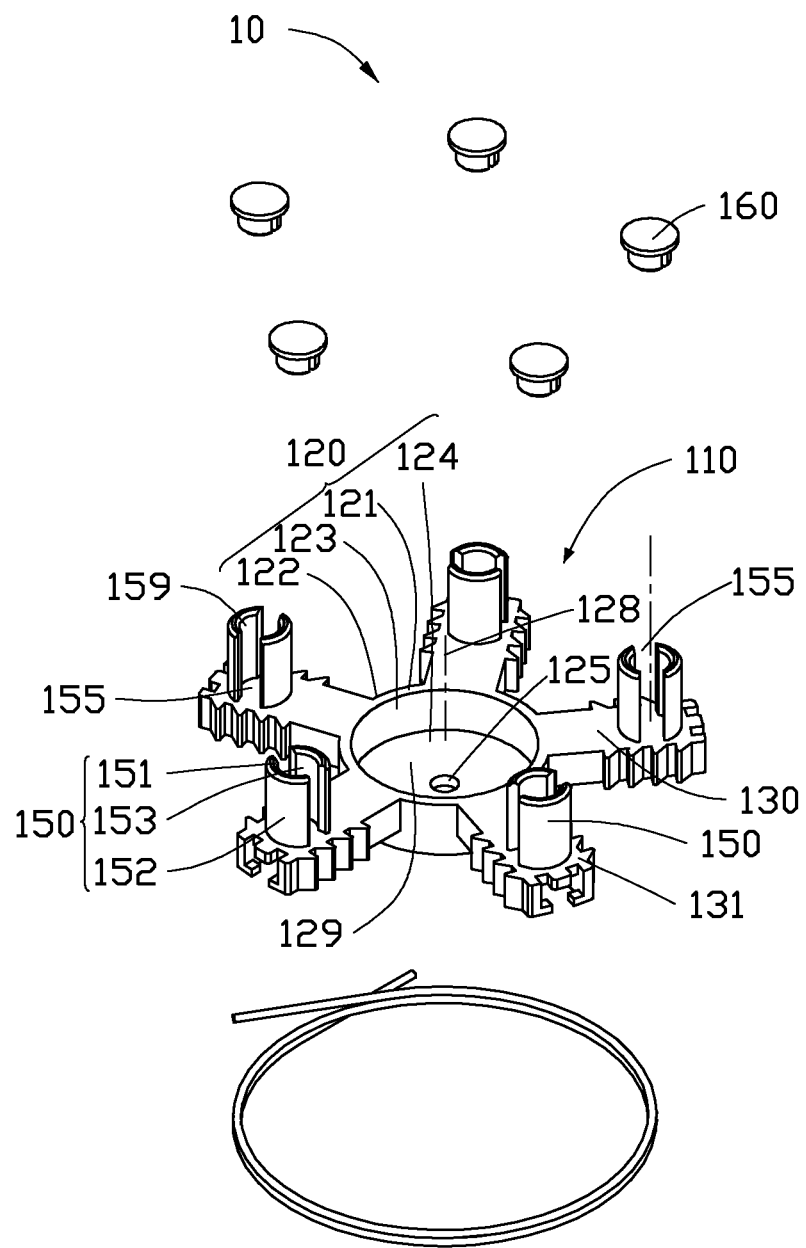
FIG. 1 is an exploded, isometric view of a first embodiment of a wire holder.

Referring to FIG. 1, in a first embodiment, a wire holder 10 used for collecting wires, such as optical fiber cables, includes a main body 110 and a plurality of caps 160. The main body 110 includes a mounting body 120 and a plurality of collection arms 130.

The mounting body 120 is cylindrical and hollow, and defines a first central hole 129. The mounting body 120 includes a first top surface 121, a first cylindrical outer surface 122, and a first cylindrical inner surface 123. The first central hole 129 extends from the first top surface 121 of the mounting body 120 to a tail 124 of the mounting body 120. The tail 124 defines a mounting hole 125 passing through the tail 124, and the mounting body 120 can be fixed by screwing via the mounting hole 125. The mounting body 120 includes a rotation axis 128.

The collection arms 130 extend from the first cylindrical outer surface 126, and extend substantially perpendicular to the rotation axis 128 of the mounting body 120. The collection arms 130 encircle the cylindrical outer surface 122. The collection arms 130 can be spaced evenly apart and have substantially the same angular gap around the cylindrical outer surface 122. Each collection arm 130 includes a second top surface 131 substantially coplanar with the first top surface 121 of the mounting body 120.

Each collection arm 130 includes two opposite sidewalls 132 substantially perpendicularly connected to the second top surface 131 and a connecting surface 133 interconnecting the two opposite sidewalls 132. The connecting surface 133 defines a buckling groove 135. A plurality of locking teeth 136 are arranged at the opposite sidewalls 132. A first fixing pole 150 extends from the second top surface 131 of each collection arm 130 and at the distal end of the collection arm 130.

The first fixing pole 150 is cylindrical and hollow, and defines a second central hole 159. The first fixing pole 150 includes a third top surface 151, a second cylindrical outer surface 152, and a second cylindrical inner surface 153. The second central hole 159 extends from the third top surface 151 of the first fixing pole 150. Each first fixing pole 150 defines two openings 155 at opposite sides of the first fixing pole 150. The openings 155 extend from the third top surface 151 of the first fixing pole 150 and extend substantially parallel to the rotation axis 128. The openings 155 pass through the second cylindrical outer surface 152 and the second cylindrical inner surface 153. The openings 155 of the fixing bodies 150 form a first circular space to receive an optical fiber cable.

Figure 2:
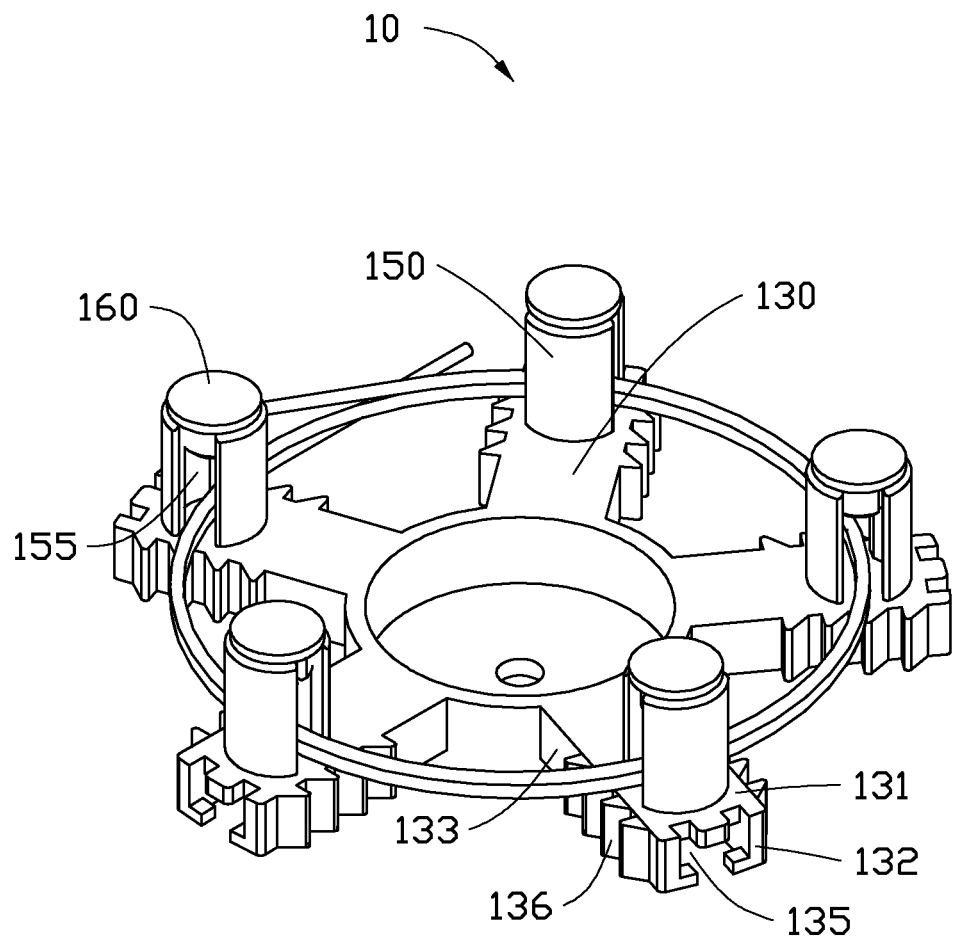
FIG. 2 is an assembled, isometric view of the wire holder of FIG. 1, showing an optical fiber cable coiled in the wire holder.

Referring also to FIG. 2, in assembly of the wire holder 10, the caps 160 are mounted to cover the second central hole 159 of the first fixing pole 150. When the wire body 10 is in use, the caps 160 can hold the optical fiber cable coiled in the first circular space formed by the openings 155 of the first fixing pole 150. Therefore, the optical fiber cable can be safely collected in the wire holder 10.

Figure 3:
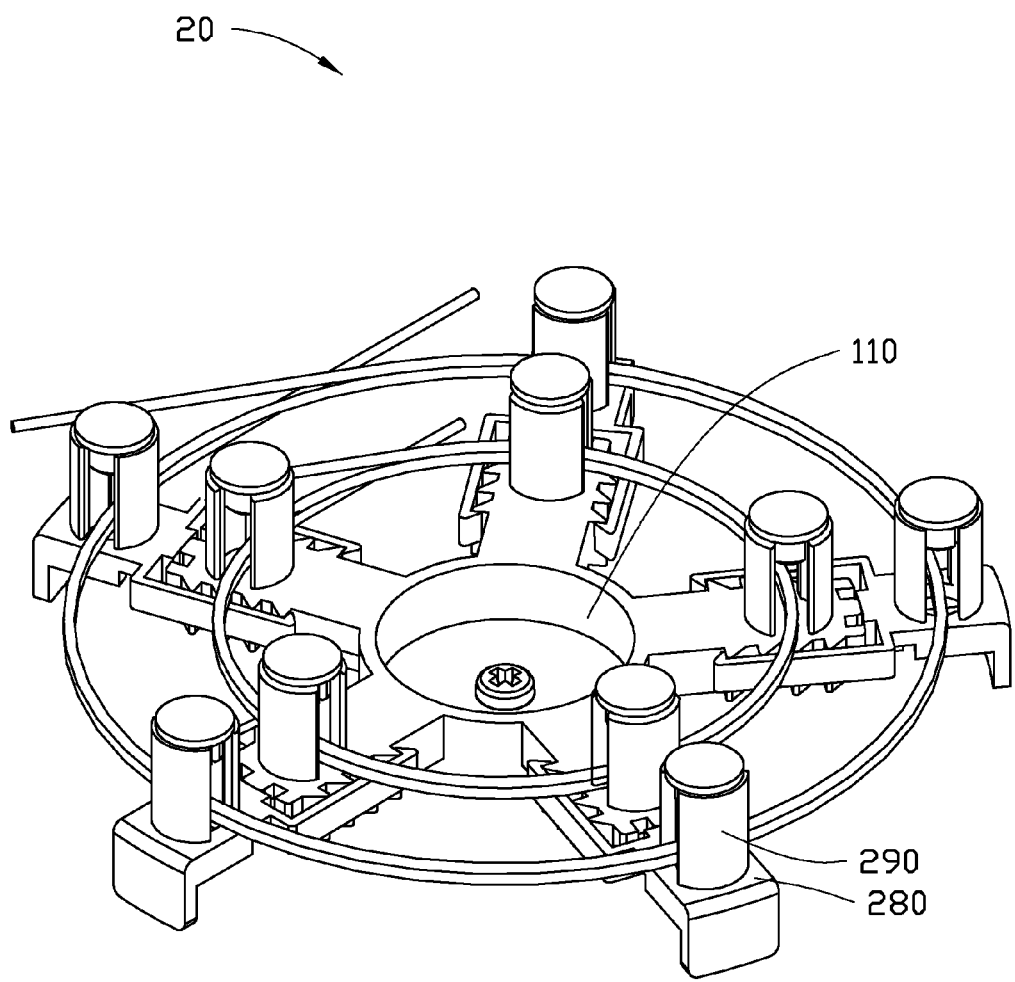
FIG. 3 is an isometric view of a second embodiment of a wire holder.
Figure 4:
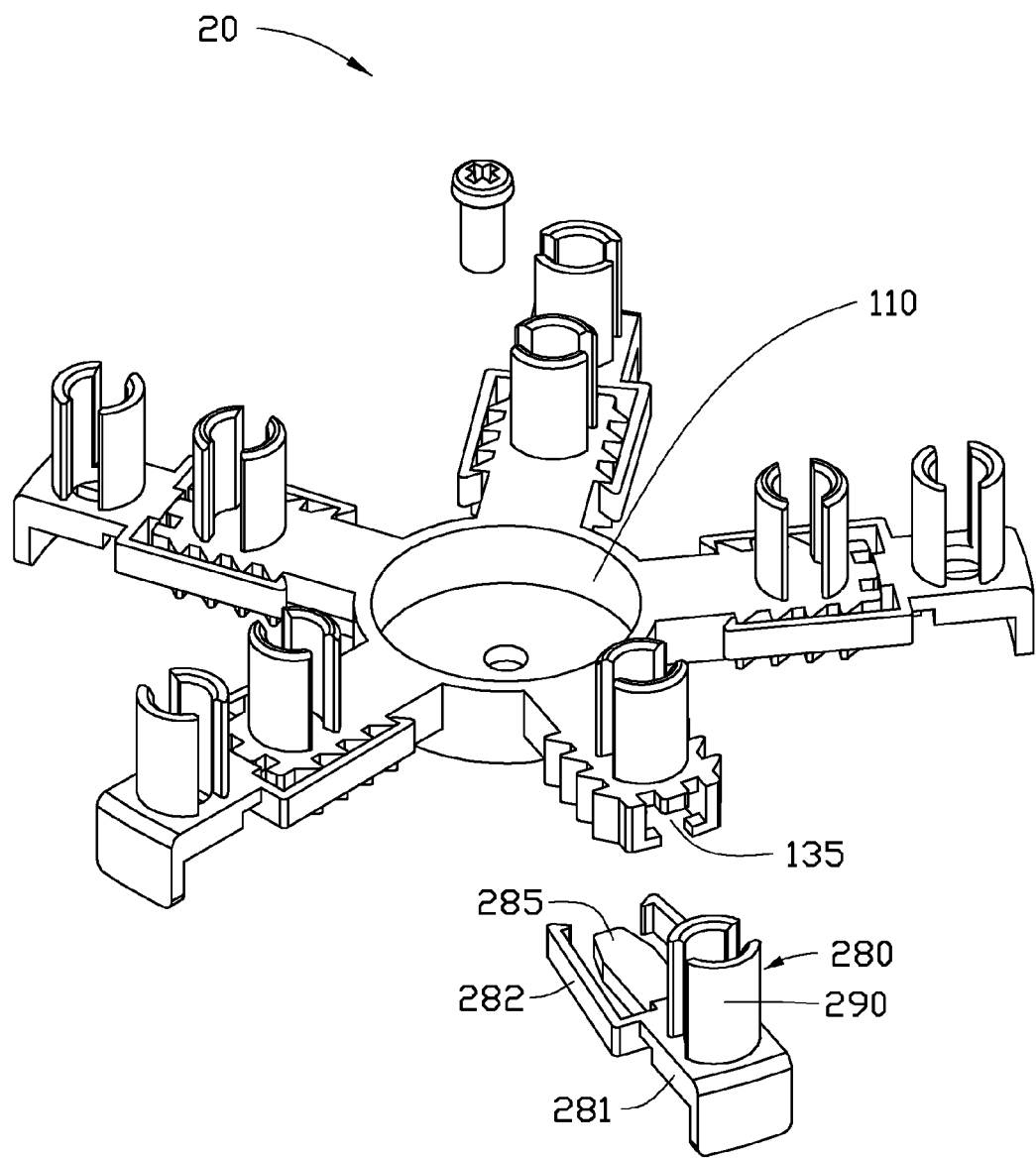
FIG. 4 is a partial exploded view of the wire holder of FIG. 3.
Figure 5:
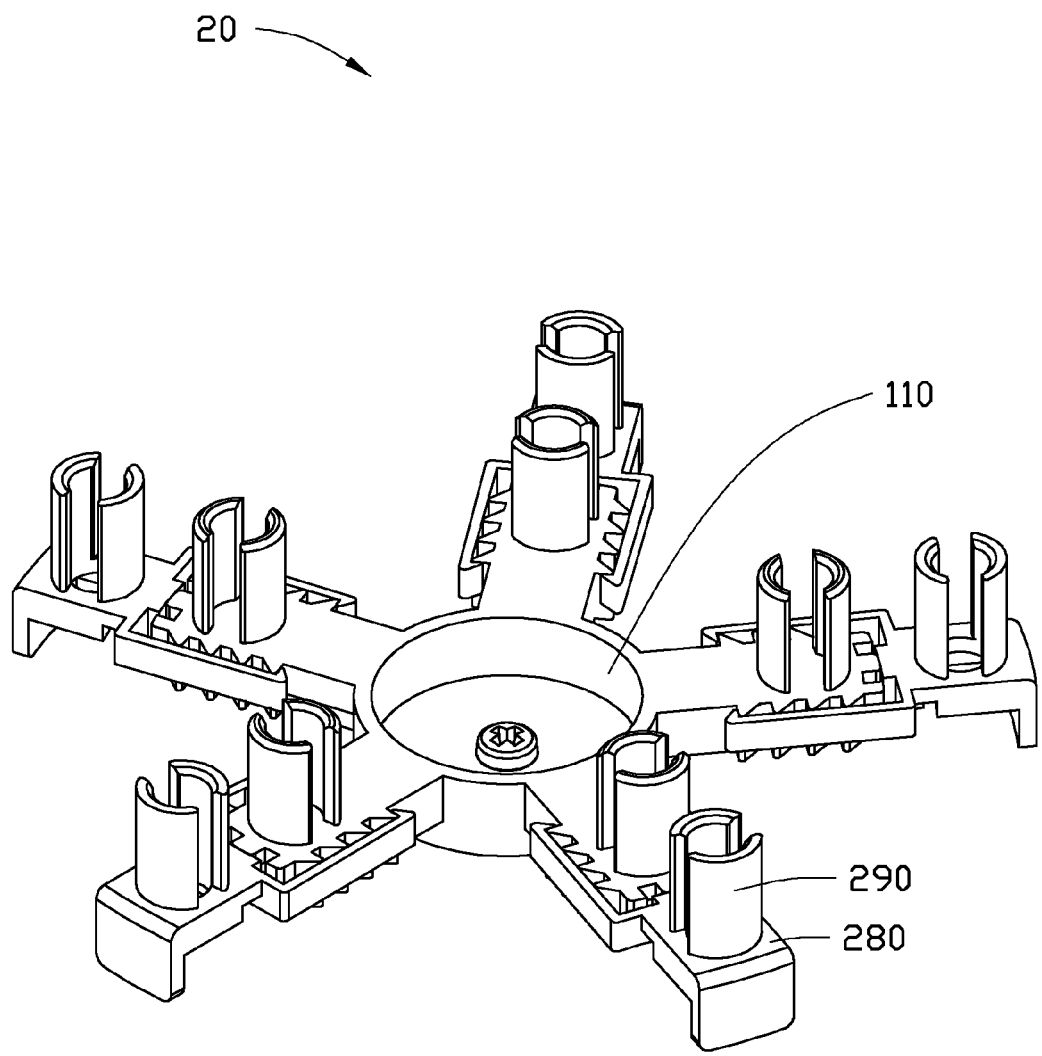
FIG. 5 is an assembled, isometric view of the wire holder of FIG. 4.

Referring to FIGS. 3-5, a second embodiment of a wire holder 20 is shown. The structure of the second embodiment of the wire holder 20 is similar to the structure of the first embodiment of the wire holder 10, except that the wire holder 20 further includes a plurality of extension collection arms 280. Each extension collection arms 280 includes an extension body 281, a buckling protrusion 285 extending from the extension body 281, two clasps 282 extending from the extension body 281 and located at opposite sides of the buckling protrusion 285, and a second fixing pole 290 extending from a top surface of the extension body 281. The second fixing pole 290 has substantially the same structure as the first fixing pole. The extension collection arms 280 can be mounted to the collection arms of the wire holder 20 by engaging with the buckling grooves, the locking teeth 236, the buckling protrusions 285, and the clasps 282. The buckling protrusions 285 can be inserted into the buckling grooves 135, and the buckling protrusions 285 of the extension collection arms 280 are movable back and forth in the buckling grooves 135, thereby retracting further into the buckling grooves 135 of the collection arms 130 and extending further out from the buckling grooves 135. The clasps 282 mesh with any one of the locking teeth 236 of the collection arm 130. The distance between the second fixing poles 290 of the extension collection arms 280 and the rotation axis 280 is adjustable by moving the buckling protrusions 285 of the extension collection arms 280 back or forth in the buckling grooves 135. When the buckling protrusions 285 move to a desired position, the clasps 282 are locked to a locking tooth 236 of the collection arms.

In assembly of the wire holder 20, the buckling protrusions 285 of the extension collection arms 280 are inserted into the buckling grooves 135 of the collection arms 130, and the clasps 282 are locked to a locking tooth 236 of the collection arms. Therefore, the extension collection arms 280 are mounted to the collection arms. After the extension collection arms 280 are mounted to the collection arms, openings of the second fixing poles 290 form a second circular space. Therefore, two optical fiber cables can be collected in the first and second circular spaces formed by the openings of the first and second fixing poles 150, 290, respectively. After the optical fiber cables are coiled in the first and second circular spaces of the openings, the caps can be mounted to cover the first and second fixing poles 150, 290 to hold the optical fiber cables in the openings of the first and second fixing poles 150, 290.

Figure 6:
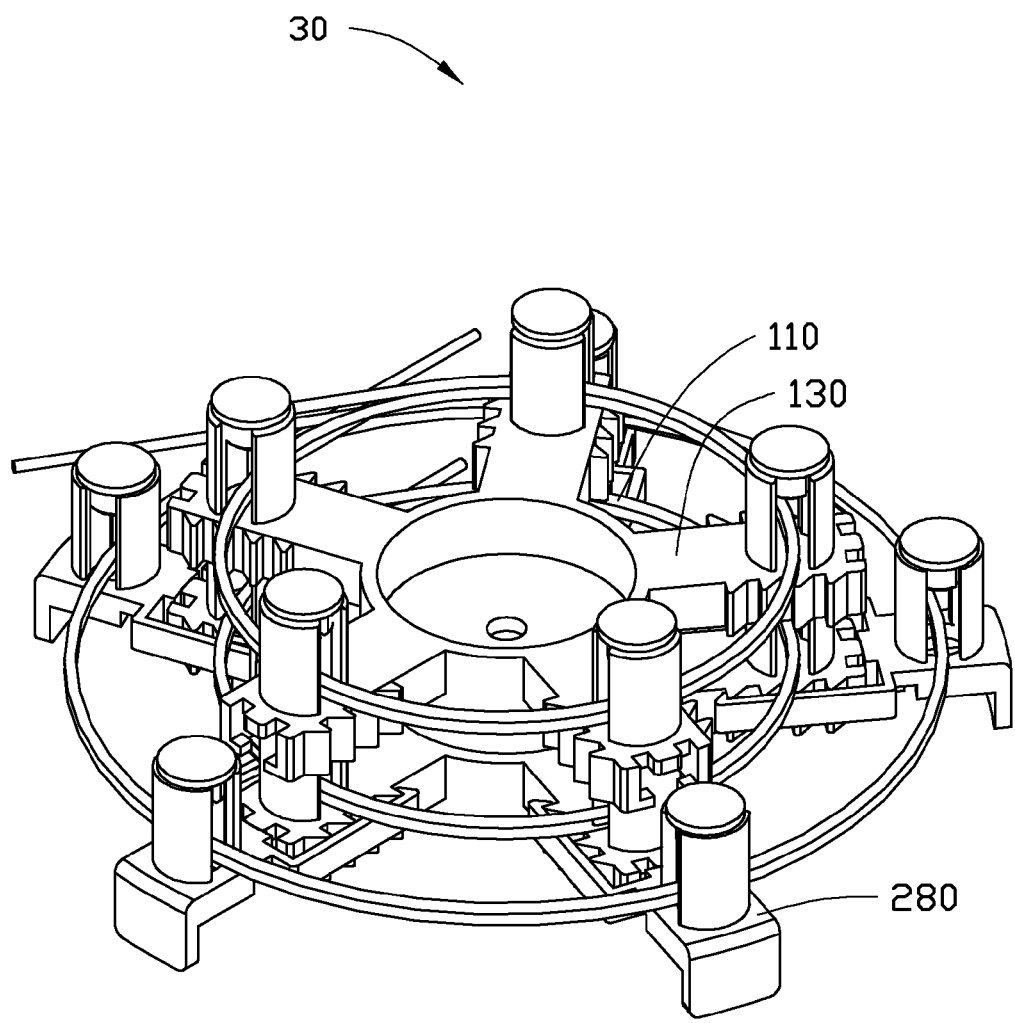
FIG. 6 is an isometric view of a third embodiment of a wire holder.

Referring to FIG. 6, a third embodiment of a wire holder 30 is similar to the structure of the second embodiment of the wire holder 20, except that the wire holder 30 includes two main bodies 110 stacked on top of each other. The two main bodies 110 can be mounted on top of each other via a connection element. The extension collection arms 280 are mounted to the collection arms 130 of one of the two main bodies 110. Three optical fiber cables can be received in the two first circular spaces of the two main bodies 110 and the second circular space of the extension collection arms 280.

It is believed that the present embodiments and their advantages will be understood from the foregoing description, and it will be apparent that various changes may be made thereto without departing from the spirit and scope of the description or sacrificing all of their material advantages.

What is claimed is:

1. A wire holder, comprising a main body, the main body comprising:
    a mounting body defining a rotation axis and comprising a first cylindrical outer surface; and
    a plurality of collection arms extending from the first cylindrical outer surface and encircling the cylindrical outer surface, wherein each collection arm comprises a first fixing pole extending substantially parallel to the rotation axis, each first fixing pole defines two openings passing through the first fixing poles, and the openings of the first fixing poles collectively form a first circular space; wherein each collection arm comprises two opposite sidewalls substantially perpendicularly connected to the second top surface and a connecting surface interconnecting the two opposite sidewalls, the connecting surface defines a buckling groove, and a plurality of locking teeth are arranged at the opposite sidewalls.

2. The wire holder of claim 1, wherein the mounting body is cylindrical and hollow and defines a first central hole, the mounting body comprises a first top surface and the first cylindrical outer surface, the first central hole extends from the first top surface of the mounting body to a tail of the mounting body.

3. The wire holder of claim 2, wherein the tail defines a mounting hole passing through the tail.

4. The wire holder of claim 2, wherein the collection arms extend substantially perpendicular to the rotation axis of the mounting body, and each collection arm comprises a second top surface substantially coplanar with the first top surface of the mounting body.

5. The wire holder of claim 4, wherein the first fixing poles extend from the second top surface and located at a distal end of the collection arms, and the collection arms have a substantially same angular gap between each of the collection arms around the cylindrical outer surface.

6. The wire holder of claim 5, wherein each first fixing pole is cylindrical and hollow, and defines a second central hole, the first fixing pole comprises a third top surface, a second cylindrical outer surface, and a second cylindrical inner surface, and the second central hole extends from the third top surface of the first fixing pole and extends substantially parallel to the rotation axis.

7. The wire holder of claim 6, wherein each first fixing pole defines the two openings at opposite sides of the first fixing pole, the openings extend from a third top surface of the first fixing pole and extend substantially parallel to the rotation axis, the openings pass through the second cylindrical outer surface and the second cylindrical inner surface, and the openings of the fixing bodies form the first circular space.

8. The wire holder of claim 7, further comprising a plurality of caps mounted to the first fixing poles to cover the openings.

9. The wire holder of claim 1, wherein the wire holder further comprises a plurality of extension collection arms, each of the extension collection arms comprises an extension body, a buckling protrusion extending from the extension body, two clasps extending from the extension body and located at opposite sides of the buckling protrusion, and a second fixing pole extending from a top surface of the extension body, the second fixing pole comprises a substantially same structure with the first fixing pole, the extension collection arms are mounted to the collection arms of the main body by engaging with the buckling grooves, the locking teeth, the buckling protrusions, and the clasps, openings of the second fixing poles form a second circular space.

\* \* \* \* \*